United States Patent [19]
Janda

[11] 3,854,404
[45] Dec. 17, 1974

[54] TURNTABLE FOR HEAVY OBJECTS

[76] Inventor: Joseph F. Janda, 423 38th St. N.E., Cedar Rapids, Iowa 52402

[22] Filed: Feb. 18, 1972

[21] Appl. No.: 227,460

[52] U.S. Cl.......................... 104/44, 104/38, 104/45
[51] Int. Cl. ............................................. B60s 13/02
[58] Field of Search ............ 104/35, 36, 38, 44, 45, 104/46, 47

[56] References Cited
UNITED STATES PATENTS

| | | | |
|---|---|---|---|
| 360,479 | 4/1887 | Priaulx.................................. | 104/47 |
| 1,532,728 | 4/1925 | Brobst.................................. | 104/44 |
| 2,025,320 | 12/1935 | Waalkes.............................. | 104/44 |
| 2,058,115 | 10/1936 | Wheeler............................... | 104/44 |

FOREIGN PATENTS OR APPLICATIONS

| | | | |
|---|---|---|---|
| 597,073 | 4/1960 | Canada................................. | 104/35 |

Primary Examiner—M. Henson Wood, Jr.
Assistant Examiner—Robert Saifer
Attorney, Agent, or Firm—James C. Nemmers; Haven E. Simmons

[57] ABSTRACT

This invention relates to turntables of a type that are used in automobile showrooms and other locations for displaying and advertising automobiles and other heavy objects. The invention includes a supporting structure in which none of the weight of the display stand or the automobile is carried by the drive arrangement, the entire weight being carried by several casters located at a short distance from the center of rotation.

6 Claims, 5 Drawing Figures

PATENTED DEC 17 1974    3,854,404

TURNTABLE FOR HEAVY OBJECTS

BACKGROUND OF THE INVENTION

In advertising large objects such as automobiles in a dealer's showroom, one of the most effective ways to display the automobile is by very slowly rotating the automobile continuously in front of the showroom window. Turntables for this purpose have been known and some of them used for many years, but because of the weight of present day automobiles many of the prior art turntables are quite expensive and require relatively large amounts of power to rotate the display stand. Moreover, many of the prior art turntables were quite heavy and cumbersome and were not easily moved from place to place. The number of automobiles sold each year has increased steadily in recent times and the competition for their sales has become increasingly intense. Therefore, dealers are always looking for better ways to advertise and display their product, particularly the smaller dealers. There is, therefore, a need for an easily portable and inexpensive rotatable display stand for vehicles of all sizes and types.

SUMMARY OF THE INVENTION

The turntable or rotating display stand of the invention distributes the entire weight of both the display stand and the vehicle it is supporting over a plurality of casters surrounding the center of rotation at a short distance therefrom. The casters run on a base plate which in turn supports the drive mechanism. The display stand, of course, is connected to the drive mechanism, but since the drive mechanism carries none of the weight a low power motor can be utilized and complex and expensive bearings are eliminated. Because of its simplicity, a display stand made according to the principles of the invention is light weight and easily portable and can be operated continuously over long periods of time at a minimum cost.

DESCRIPTION OF THE PREFERRED EMBODIMENT OF THE INVENTION

Figure 5:
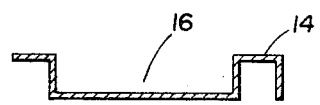
FIG. 5 is a sectional view of a portion of the deck portion taken on the line 5—5 of FIG. 2 and illustrating the shape of the track channel.
Figure 4:
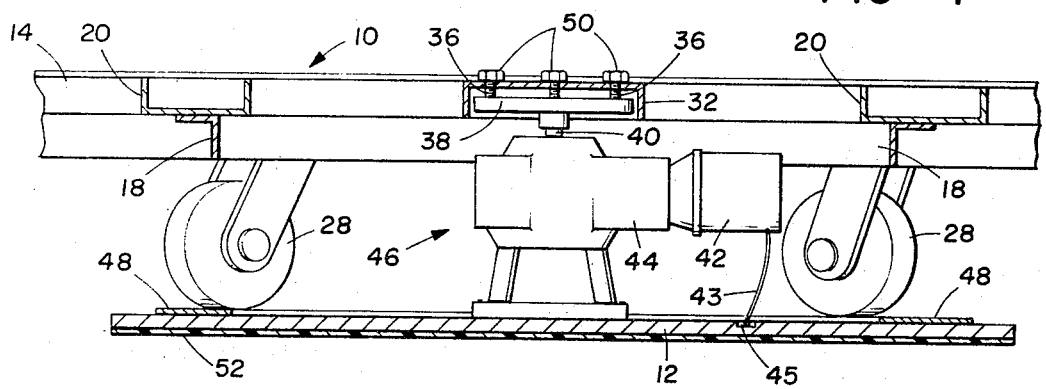
FIG. 4 is an enlarged elevational view partly in section taken on the line 4—4 of FIG. 2.

The rotating display stand or turntable of the invention consists of a deck portion indicated generally by the reference numeral 10 and a base portion indicated generally by the reference numeral 12. The deck portion 10 is preferably rectangular in configuration and of a size to accommodate the object to be displayed such as an automobile (not shown). The deck 10 includes two parallel spaced-apart longitudinally extending track channels 14 each of which provides a longitudinally extending groove 16 to receive the wheels of the vehicle when it is supported on the display stand. The track channels 14 are each shaped in a manner indicated in FIG. 5 so as to provide rigid and strong structural supporting members which are in turn rigidly connected to and supported by the main support ring 18 which may be a large angle iron rolled and welded into a single member of circular shape. A pair of stabilizer members 20 extend perpendicular to the track channels 14 and are rigidly connected to channels 14 and to the support ring 18. Four braces 22 interconnect the support ring 18, stabilizer members 20 and track channels 14, and at the outer ends of the track channels 14 there are provided outboard channels 24 which extend longitudinally to the track channels 14 and are rigidly connected thereto. If desired, end caps consisting of channels 26 can be provided outwardly of the outboard channels 24 extending transversely of the track channels 14. The foregoing structure, when welded or otherwise rigidly connected provides a strong supporting deck for the object to be displayed.

Affixed to the main support ring 18 and depending therefrom are a plurality of casters 28 which are preferably evenly spaced around the support ring 18 to distribute uniformly any force applied thereto. Also, there is affixed at each of the corners of the deck 10 an outboard caster 30 each of which is affixed to a respective one of the outboard channels 24. Extending across the support ring 18 and located centrally thereof is a drive plate channel 32. Drive plate channel 32 is rigidly connected to the support ring 18 and is provided with a plurality of openings 34 which receive the drive pins 36 extending upwardly from the drive plate 38 of a drive unit indicated generally by reference numeral 46. Drive plate 38 is affixed to and rotatable with a drive shaft 40 driven by an electric motor 42 through a gear reduction unit 44 which reduces the speed of the motor 42 so that the drive plate 38 is rotated at a very slow speed such as one-half revolution per minute. Power is supplied to motor 42 from a source of electrical power (not shown) through a cord 43 that terminates at an outlet 47 which may be secured to base 12. Cord 43 preferably is located in a channel 45 in base 12 so as not to interfere with the movement of casters 28 around the base 12. The drive unit 46 is affixed to and supported on the base 12, centrally of a tracking ring 48. The diameter of the tracking ring 48 is the same approximate dimension as the distance between diametrically opposed casters 28 and its center is the same as the axis of drive shaft 40 so that the casters 28 will run on and around the tracking ring 48 at all times when the deck 10 is assembled onto the base 12. The tracking ring 48 is preferably of a hard material capable of supporting the weight to be carried by the display stand and ring 48 should have a hardened surface to give it good wear properties.

When the unit is in assembled condition, the deck 10 is mounted on the base portion 12 with the drive pins 36 extending through the openings 34 in the drive plate channel 32. If desired, the drive pins 36 may have threaded ends and nuts 50 may be used to secure the deck 10 and base 12 in assembled relationship. When the display stand is assembled, the casters 28 will rest on the tracking ring 48 of the base plate 12 and carry all of the weight of the unit and the weight of the object being displayed. The dimensions of the unit are so designed that none of the weight of the deck 10 or the object which it supports will be exerted on the drive plate 38 or any portion of the drive unit 46. As shown in FIG.

Figure 1:
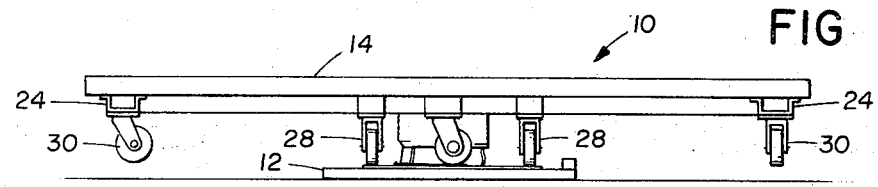
FIG. 1 is a side elevational view of a display stand constructed according to the principles of the invention.
Figure 2:
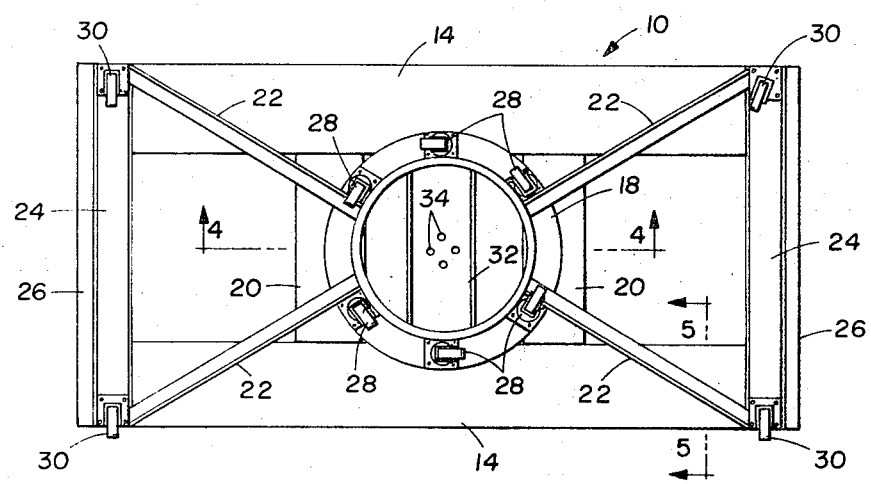
FIG. 2 is a bottom plan view of the deck portion of the display stand.
Figure 3:
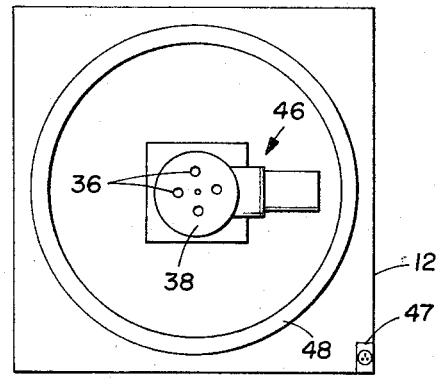
FIG. 3 is a top plan view of the base plate and drive mechanism, the deck not being shown.

4, there is a clearance between the drive channel 32 and drive plate 38 to assure that the drive unit 46 will be free from any vertical force. Also, as best seen in FIG. 1, when the display stand is assembled, the outboard casters 30 do not engage the ground. The purpose of the outboard casters 30 is to avoid damage to the unit and the displayed object particularly during the time when the automobile or other vehicle is being driven onto or off of the deck 10. The outboard casters 30 prevent accidental tipping of the deck 10 but normally do not carry any of the weight thereof during operation.

As previously indicated, the entire weight of the deck 10 and the object it supports is carried by the casters 28. Casters 28 are relatively inexpensive standard items which are readily available and they can be easily assembled onto the unit. They require no machining and little or no maintenance and eliminate the necessity for bearings which are commonly found on prior art units. Because prior art units carried the weight through bearings, the design of the prior art units was somewhat critical to assure even distribution of the load. Many times this was impossible and excessive wear on the bearings resulted. With the unit of the invention, because the entire weight of the deck and the object being displayed thereon is carried by the casters 28, the drive unit 46 can be a relatively inexpensive design. I have found that a standard automobile can be displayed on a display stand constructed according to my invention and driven continuously over long periods of time using an electric motor 42 of a fractional horsepower such as ¼ hp. Thus, the entire design of the unit is extremely simple and the complete unit is relatively lightweight and, therefore, readily portable.

I have found that if a display stand is constructed according to the principles of my invention, a unit weighing approximately 750 lbs. will support a a 1 ton vehicle, and a unit weighing approximately 900 lbs. is capable of supporting a 2 ton vehicle. If used on a floor surface which has a relatively high coefficient of friction, there is no necessity to secure the unit to the floor since it will not creep. If used on a smooth floor with a low coefficient of friction, it may be necessary to provide the base 12 with some means of preventing creep such as pad 52 which is preferably of a rubber material. Because the design of the unit is such that it need not be secured to the floor, and because it is relatively light in weight, it can be moved from location to location, thus greatly increasing its utility. If vehicles are the objects to be displayed, they can easily be driven up onto the deck by use of a ramp (not shown) of any suitable design.

The preferred embodiment disclosed herein is of a particular structural configuration, but obviously other structural configurations can be utilized while still employing the principles of the invention. It will be obvious to those skilled in the art that various revisions and modifications can be made to the preferred embodiment disclosed herein without departing from the spirit and scope of the invention. It is my intention, however, that all such revisions and modifications as are obvious to those skilled in the art will be included within the scope of the following claims:

I claim

1. A portable turntable for displaying a heavy object, said turntable comprising a supporting base engageable with the floor or other supporting surface for the turntable, a deck rotatable about a vertical axis and having a substantially flat upper surface suitable for carrying said object, a plurality of rollable anti-friction means affixed to the lower surface of said deck around the center thereof at locations equally distant from said axis, said anti-friction means being rollable on said base and transmitting the entire weight of said deck and the object carried thereby to said base, and drive means supported by said base and removably connected to said deck for controllably rotating said deck about said axis, said drive means including a motor, a vertical drive shaft driven by said motor, a drive plate connected to said shaft, and vertical drive pins connecting said drive plate and said deck, said drive plate being vertically spaced from said deck so as not to receive any vertical force therefrom.

2. The turntable of claim 1 in which said rollable anti-friction means are casters affixed to said deck.

3. The turntable of claim 2 in which outboard casters are affixed to said deck at the outermost edges thereof, said outboard casters being at a level so as normally not to engage said base or the surface upon which said base rests.

4. The turntable of claim 3 in which said deck includes a main supporting ring located in the center of said deck, the axis of rotation of said deck being in the center of said ring, and said anti-friction means are equally spaced about said ring and depend therefrom.

5. The turntable of claim 4 in which the undersurface of said base is provided with means having a relatively high coefficient of friction to restrain lateral movement of said base.

6. The turntable of claim 3 in which that portion of said base that is engaged by said anti-friction means is provided with a wear resistant hardened surface capable of bearing the forces exerted thereon by said means when said deck is carrying a heavy object.

* * * * *